United States Patent [19]

Kanno et al.

[11] Patent Number: 4,998,122

[45] Date of Patent: Mar. 5, 1991

[54] IMAGE BINARIZATION APPARATUS

[75] Inventors: Hiroki Kanno, Yokohama; Hitoshi Yoneda, Kawasaki; Hironobu Machida, Yokohama, all of Japan

[73] Assignee: Kabushiki Kaisha Toshiba, Kawasaki, Japan

[21] Appl. No.: 407,153

[22] Filed: Sep. 14, 1989

[30] Foreign Application Priority Data

Oct. 7, 1988 [JP] Japan ................................ 63-251928

[51] Int. Cl.$^5$ ............................................ H04N 1/40
[52] U.S. Cl. ..................................... 358/462; 358/466; 382/50
[58] Field of Search ..................... 358/462, 466; 382/9, 382/10, 50

[56] References Cited

U.S. PATENT DOCUMENTS

| | | | |
|---|---|---|---|
| 4,547,811 | 10/1985 | Ochi et al. | 358/462 |
| 4,553,172 | 11/1985 | Yamada et al. | 358/462 |
| 4,668,995 | 5/1987 | Chen et al. | 358/462 |
| 4,914,524 | 4/1990 | Kimura | 358/462 |
| 4,953,012 | 8/1990 | Abe | 358/462 |

Primary Examiner—Edward L. Coles, Sr.

Attorney, Agent, or Firm—Finnegan, Henderson, Farabow, Garrett and Dunner

[57] ABSTRACT

A feature-analyzing section determines whether a given picture element included in image information supplied from a line buffer represents a character portion or a photograph portion. In accordance with the determination made by the feature-analyzing section, a threshold value selection section selects either a threshold value calculated by a first threshold value calculation section, and to be used in relation to charcter portion, or a threshold value calculated by a second threshold value calculation section, and to be used in relation to photograph portion. By using the threshold value selected by the threshold value selection section, a binary-encoding section binary-encodes image information which is supplied thereto through a delay circuit. On the basis of the determination made by the feature-analyzing section, a determination section determines whether or not the given picture element represents a bold character portion. If the determination section determines that the given picture element represents a bold character portion, a selection section then selects a predetermined value supplied from a value generation section, in place of an output of the binary-encoding section.

15 Claims, 7 Drawing Sheets

IMAGE BINARIZATION APPARATUS

BACKGROUND OF THE INVENTION

1. Field of the Invention

The present invention relates to an image binarization system which is employed in an image reader or a facsimile machine to convert a read image into a binary-encoded image.

2. Description of the Related Art

In an image processing apparatus which makes use of image signals, binary-encoding processings are performed to convert an image read by an image reader (the image being composed of gradations determined in accordance with the image density thereof) into an image expressed by binary codes, namely black and white codes. In the binary-encoding processings, an image made up of gradations is converted into the binary codes by using a predetermined threshold value.

Normally, a plurality of threshold values are used in the binary-encoding processings performed by an image processing apparatus. To be specific, an image read by the image reader is classified into two image portions, one being a portion, such as a character or a line, exhibiting sharp contrast in relation to surrounding regions, the other having a portion composed of gradations, such as in a photograph. (The former and latter portions will hereinafter be referred to as a "character portion" and a "photograph portion", respectively.) Of these two image portions, the character portion is converted into binary codes by use of a fixed value determined beforehand, while the photograph portion is converted into binary codes by use of a pseudo gradation method, such as a dithering method. If the entire image read by the image reader were to be converted into binary codes by use of only a single, fixed, threshold value, the image quality of the character portion would not be adversely affected as a result of conversion, since its original image density would be maintained; however, the image quality of the photograph portion would be adversely affected, since use of a single threshould value would result in the loss of the original gradations. It is for this reason, that a plurality of threshold values are used in the image conversion process.

If, on the other hand, the entire image read by the image reader were converted into binary-encoded image data by use only of a synthetic dithering method, the photograph portion of the image would retain its original gradations, but the image quality of the character portion would be degraded, degrading the quality of the image as a whole. Thus, as can be clearly seen from the above, if binary-encoding processings of a single type are used in relation to images including different-feature portions, it is impossible to obtain images of satisfactory quality, as a result. This is because, as mentioned earlier, if an image is not binary-encoded in accordance with the specific features of its constituent portions, the quality of the resultant binary-encoded image as a whole will be degraded. Moreover, if, after the binary-encoding processings, the image is enlarged or reduced in scale, the image quality will be further degraded. Further, since the data compression method used in the binary-encoding of the image should be appropriate to the features of the various portions of the image, so as not to lower the efficiency of the binary-encoding processings, the original image should therefore first be divided into regions, in accordance with their features, and then binary-encoded.

A conventional image processing apparatus divides an image into a character portion and a photograph portion, and binary-encodes the divided portions in accordance with the features thereof. To divide the image, the conventional apparatus detects the maximum image density difference ΔDmax relating to a local region of the image, and compares the detected image density difference ΔDmax with a predetermined threshold value Th. Based on results of the comparison, the conventional apparatus divides the image into the character and photograph portions.

However, the above conventional apparatus may mistakenly determine that a character and a chart are both photograph portions if they are expressed with bold lines. (Characters and charts formed with bold lines will be hereinafter referred to as bold line portions.) This is because the maximum image density difference ΔDmax is small on the bold lines. If the character or chart formed with bold lines is regarded as a photograph portion, it will be subjected to the gradation-based binary-encoding processings, such as processings using a dithering method. Therefore, the bold lines of the character or chart will include a white portion after the processings, whereby the image quality will be deteriorated.

Let it be assumed that an original to be read is made up of normal-image density character region A, blurred-character region B (wherein a character does not present a sharp contrast to the surrounding regions), bold character region C, and photograph region D (wherein the image density does not change greatly), and that the dynamic range of the image density is of 8 bits (0 to 255). In this case, the maximum image density differences ΔDmax detected on the basis of a local region of 4×4 picture elements are as follows:

Region A: (DD to FF)h (h: hexadecimal notation)
Region B: (10 to 40)h
Region C: (0 to 10)h
Region D: (10 to 40)h If the criterion threshold value Th is (80)h, the maximum image density difference ΔDmax is judged in one of the following two ways:

$$\Delta Dmax > Th \ldots \quad (1)$$

$$\Delta Dmax \leq Th \ldots \quad (2)$$

If regions A–D are judged on the basis of these formulas, then region A is determined as a character portion, and each of regions B–D are determined as a photograph region. Therefore, the gradation-based binary-encoding processings, such as processings using a dithering method, are performed with respect to regions B–D. Actually, however, regions B and C are character portions, so that the image quality of these regions are inevitably deteriorated as a result of the binary-encoding processings.

As mentioned above, the conventional apparatus cannot binary-encode an image in an optimal manner if the image includes a character portion, a photograph portion and a bold character portion. After the binary-encoding, therefore, a white portion is included in the bold character portion of the image.

SUMMARY OF THE INVENTION

Accordingly, an object of the present invention is to provide an image binarization apparatus which binary-encodes an image whose portions have different features, without adversely affecting the image quality of the respective portions.

This object is achieved by providing an image binarization apparatus for converting image information into binary-encoded image information, said image binarization apparatus comprising:

determination means for determining whether or not the image information has a bold character portion;

means for binary-encoding the image information by use of a predetermined threshold value; and means for outputting a predetermined value in place of the binary-encoded image information outputted from the binary-encoding means, if the determination means determines that the image information has a bold character portion.

In the present invention, an image is divided into regions according to their features, and binary-encoding processings which are most appropriate to these divided regions are performed. Further, it is determined whether or not the image is a bold character portion. If the image is a bold character portion, predetermined values are selectively output, in place of a binary-encoded output. In this fashion, deterioration of the image quality of the bold character portion is prevented.

DETAILED DESCRIPTION OF THE PREFERRED EMBODIMENTS

An embodiment of the present invention may now be described, with reference to the accompanying drawings.

Figure 1:
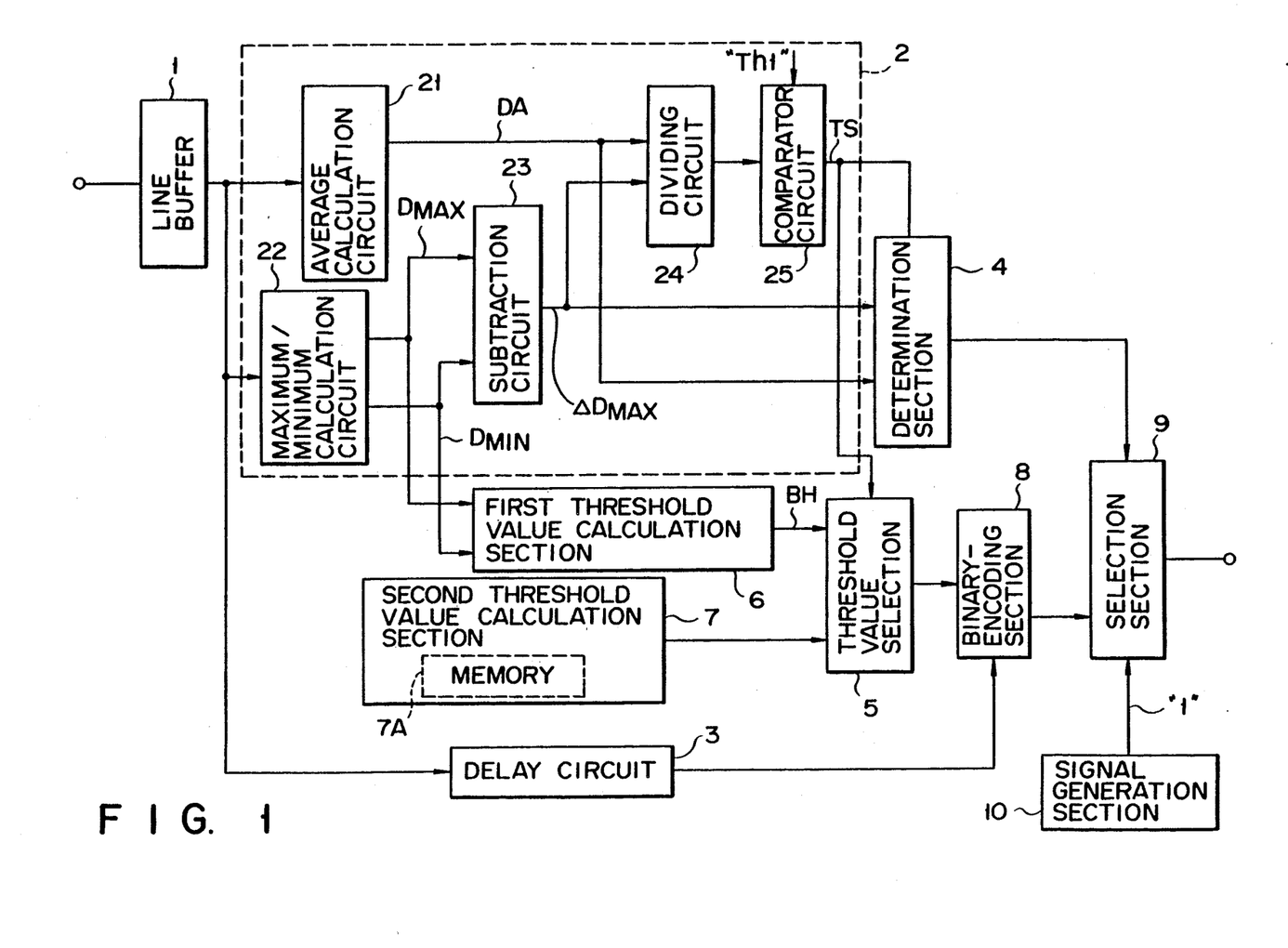
FIG. 1 is a block circuit diagram showing the construction of the image binarization apparatus according to the first embodiment of the present invention.

FIG. 1 shows an image binarization apparatus according to the embodiment. This image binarization apparatus binary-encodes an original image read by an image reader (not shown) in accordance with the features of the original image.

Figure 9:
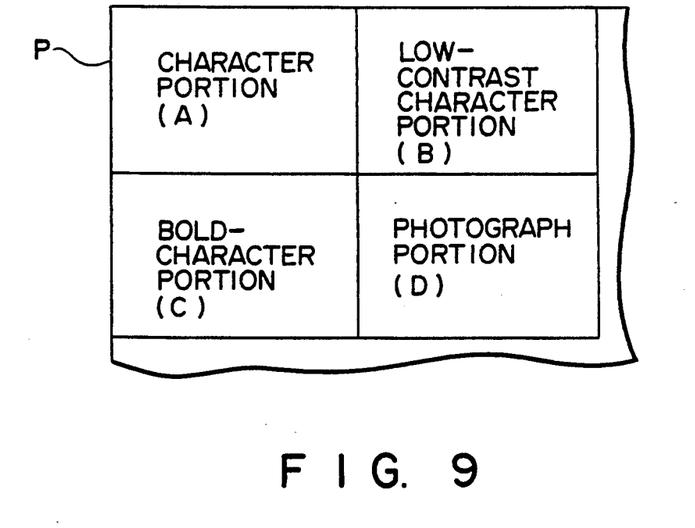
FIG. 9 illustrates an example of an original image which is to be processed by the image binarization apparatus.

FIG. 9 shows an example of an original image to be read by the image reader. As is shown in FIG. 9, this original image includes normal-contrast character region A, low-contrast character region B, bold character region C, and photograph region D.

Figure 10:
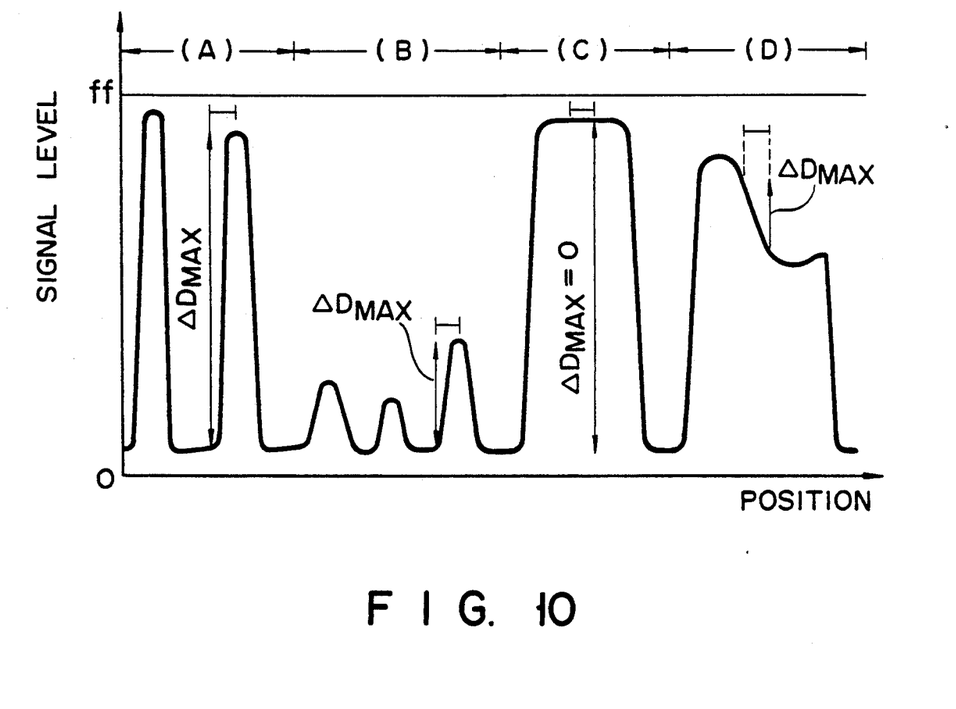
FIG. 10 is a graph showing an output obtained when the original image shown in FIG. 9 is read by an image reader.

FIG. 10 shows how the levels of the signals of regions A-D are when the original image shown in FIG. 9 is read by the image reader. The image reader generates the signals such that 8-bit digital data is output for each picture element.

The image binarization apparatus processes the image information, supplied thereto from the image reader, in units of 4×4 picture elements. In other words, the image binarization apparatus first determines whether a picture element of interest which is included in a local region of 4×4 represents a character, a photograph, or a bold character, and then binary-encodes the image of the picture elements in different ways on the basis of the determination.

Figure 2:
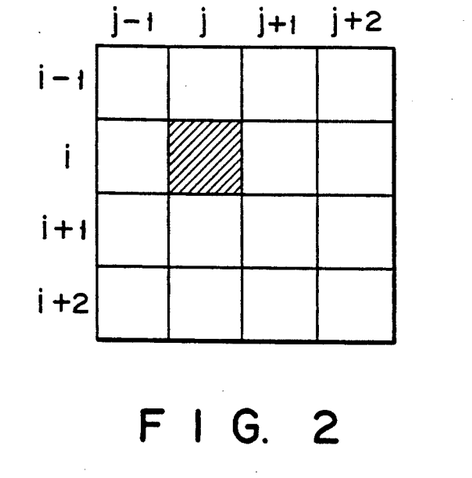
FIG. 2 illustrates a region the image in which is to be processed by the apparatus shown in FIG. 1.

FIG. 2 shows the relationship between the 4×4 picture elements and a picture element of interest. In the case shown in FIG. 2, what is represented by the picture element of interest (g, i), indicated with oblique lines in the Figure, is determined by using sixteen picture elements (j−1, i−1) through (j+2, i+2). Thereafter, one of the picture elements adjacent to the picture element of interest (j, i) is regarded as a picture element of interest, and what is represented by this picture element is determined in a similar manner. In this manner, the type of the entire image information is determined.

The image binarization apparatus comprises line buffer 1. This line buffer is adapted to temporarily store data corresponding to 4 lines of the digital data, which is generated by the image reader in synchronism with a predetermined clock and comprises 8 bits for each picture element. Feature-analyzing section 2 and delay circuit 3 are connected to line buffer 1, and the data output from line buffer 1 is supplied to both of them.

In feature-analyzing section 2, the average image density and the maximum image density difference of the local region of 4×4 picture elements are calculated, and further it is determined whether a picture element of interest included in the local region represents a character or a photograph. Determination section 4 is connected to the feature-analyzing section 2 and receives an output of section 2. Determination section 4 determines whether or not the image data supplied thereto represents a bold character.

Threshold value selection section 5 is connected to feature-analyzing section 2, and first and second threshold value calculation sections 6 and 7 are connected to threshold value selection section 5. First threshold value calculation section 6 is also connected to feature-analyzing section 2.

First threshold value calculation section 6 calculates a threshold value used for binary-encoding a character. The threshold value is calculated on the basis of the maximum and minimum image densities which are detected on the basis of the local region of 4×4 picture elements and which are supplied to section 6 by feature-analyzing section 2. The calculation is carried out in a dynamic fashion in accordance with the local region.

Second threshold value calculation section 7 calculates a threshold value used for binary-encoding a photograph portion. This calculation section includes memory 7A made up of a ROM, a RAM, or the like, and stores threshold values based on a dithering matrix.

Figure 3:
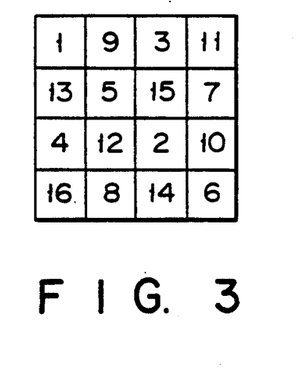
FIG. 3 illustrates an example of a dithering pattern used in the apparatus shown in FIG. 1.

FIG. 3 shows an example of a dithering matrix stored in memory 7A of second threshold value calculation section 7. The numbers in FIG. 3 are threshold values corresponding to the respective picture elements.

Threshold value selection section 5 receives results of the determination which feature-analyzing section 2 makes to see whether the local region represents a photograph portion or a character portion. Section 5 is made up of a switch and selects either an output of first threshold value calculation section 6 or an output of second threshold value calculation section 7, in accordance with the results of the determination.

Binary-encoding section 8 is connected to the output terminal of threshold value selection section 5 and to that of delay circuit 3. Selector section 9 is connected to binary-encoding section 8 and also to signal generation section 10 (which generates "1" data). The threshold value selected by section 5 is supplied to binary-encoding section 8. Based on the threshold value, binary-encoding section 8 binary-encodes the image information supplied thereto from delay circuit 3, and the binary-encoded image information is supplied to selector section 9. This selector section 9 selects "1" data and outputs it, if determination section 4 determine that the local region represents a bold-character portion.

Feature-analyzing section 2 is made up of average calculation circuit 21, maximum/minimum calculation circuit 22, subtracting circuit 23, dividing circuit 24, and comparator circuit 25. The input terminal of average calculation circuit 21 and that of maximum/minimum calculation circuit 22 are connected to the output terminal of line buffer 1. Maximum/minimum calculation circuit 22 has two output terminals, one of which is connected to subtracting circuit 23, and the other of which is connected to first threshold value calculation section 6. The output terminal of subtracting circuit 23 and that of average calculation circuit 21 are connected to the respective input terminals of dividing circuit 24. The output terminal of dividing circuit 24 is connected to the input terminal of comparator circuit 25. This comparator circuit is supplied with the threshold value "TH1" from a threshold value-generating section (not shown). The output terminal of comparator circuit 25 is connected to threshold value selection section 5. It is also connected to determination section 4, together with the output terminal of average calculation circuit 21 and that of dividing circuit 23.

The four-row image information stored in line buffer 1 is supplied to both average calculation circuit 21 and maximum/minimum calculation circuit 22 in a parallel fashion, in such a manner that the four picture elements of one row are supplied at one time. Average calculation circuit 21 calculates the average image density of a local region of 4×4 picture elements.

Figure 4:
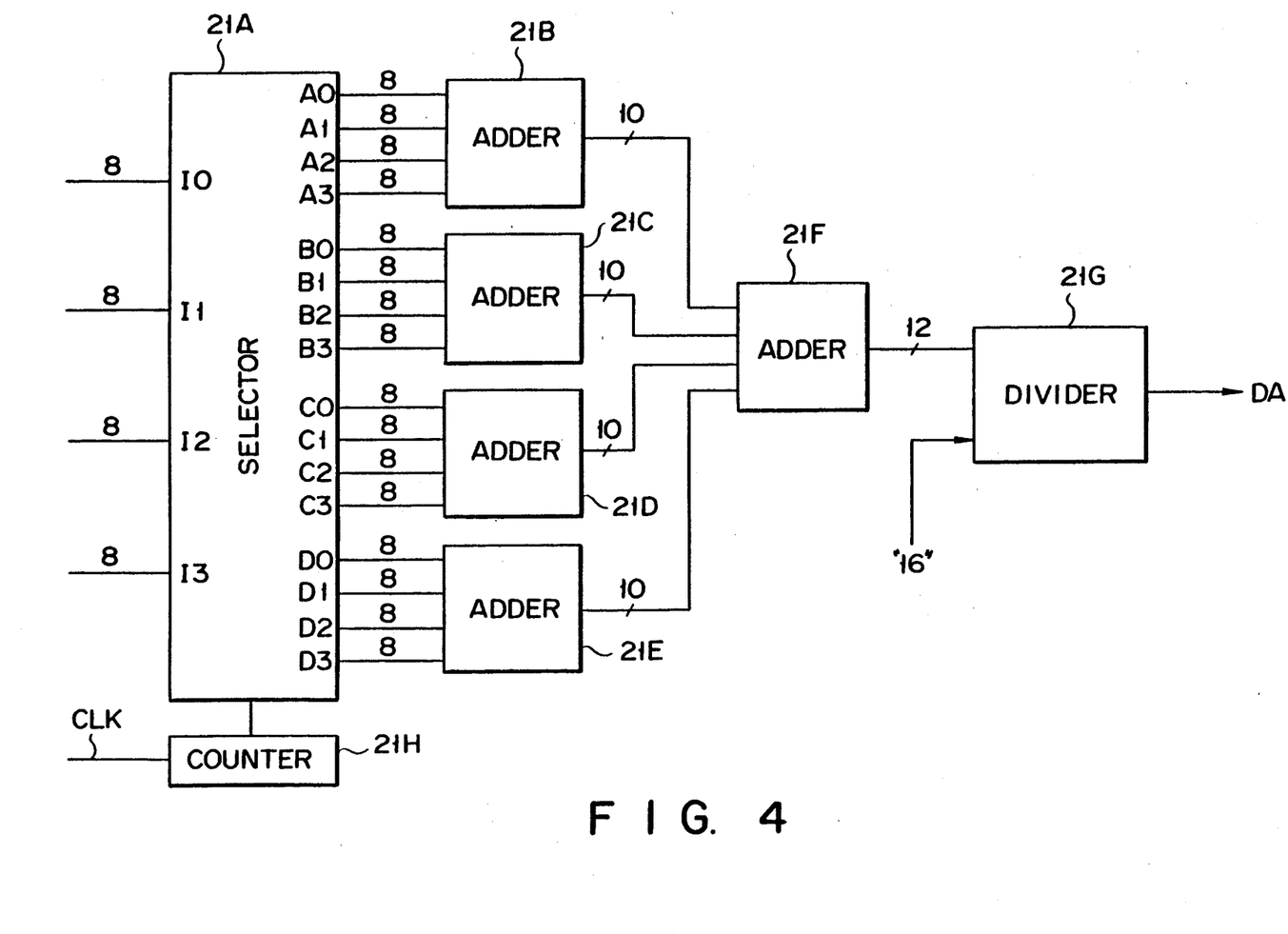
FIG. 4 is a block circuit diagram illustrating an example of a construction of the average calculation circuit shown in FIG. 1.

FIG. 4 illustrates the construction of average calculation circuit 21. As is shown in FIG. 4, average calculation circuit 21 is made up of the following elements: selector 21A having ports I0-I3, A0-A3, B0-B3, C0-C3 and D0-D3; adders 21B, 21C, 21D and 21E connected to ports A0-A3, B0-B3, C0-C3 and D0-D3, respectively; adder 21F connected to the output terminals of adders 21B, 21C, 21D and 21E; divider 21G connected to the output terminal of adder 21F; and counter 21H connected to selector 21A.

From line buffer 1, the image information is supplied to ports I0-I3 of selector 21A in synchronism with a clock pulse such that four picture elements aligned in the row direction are supplied at one time. On the basis of a selection signal supplied from counter 21H, selector 21A supplies the image information, which selector 21A receives at ports I0-I3, to one of ports A0-A3, B0-B3, C0-C3 and D0-D3. In other words, selector 21A supplies the image information to one of adders 21B, 21C, 21D and 21E on the basis of the selection signal supplied from counter 21H.

Each of adders 21B, 21C, 21D and 21E adds the image information together in the row direction in units of four picture elements, thereby calculating the sum of the image densities of the picture elements aligned in the row direction. Adder 21F adds the sums calculated by the adders together, thereby obtaining the total sum of the image densities of the picture elements included in the local region of 4×4 picture elements. Divider 21G divides the total sum with 16 (which is the number of picture elements constituting the local region), thereby obtaining the average image density DA of the local region.

Maximum/minimum calculation circuit 22 detects the maximum and minimum values of the image densities of the local region. The maximum value Dmax and the minimum value Dmin are supplied to both subtracting circuit 23 and first threshold value calculation section 6. In subtraction circuit 23, the minimum value is subtracted from the maximum value, thereby obtaining the maximum image density difference ΔDmax of the local region of 4×4 picture elements.

Figure 5:
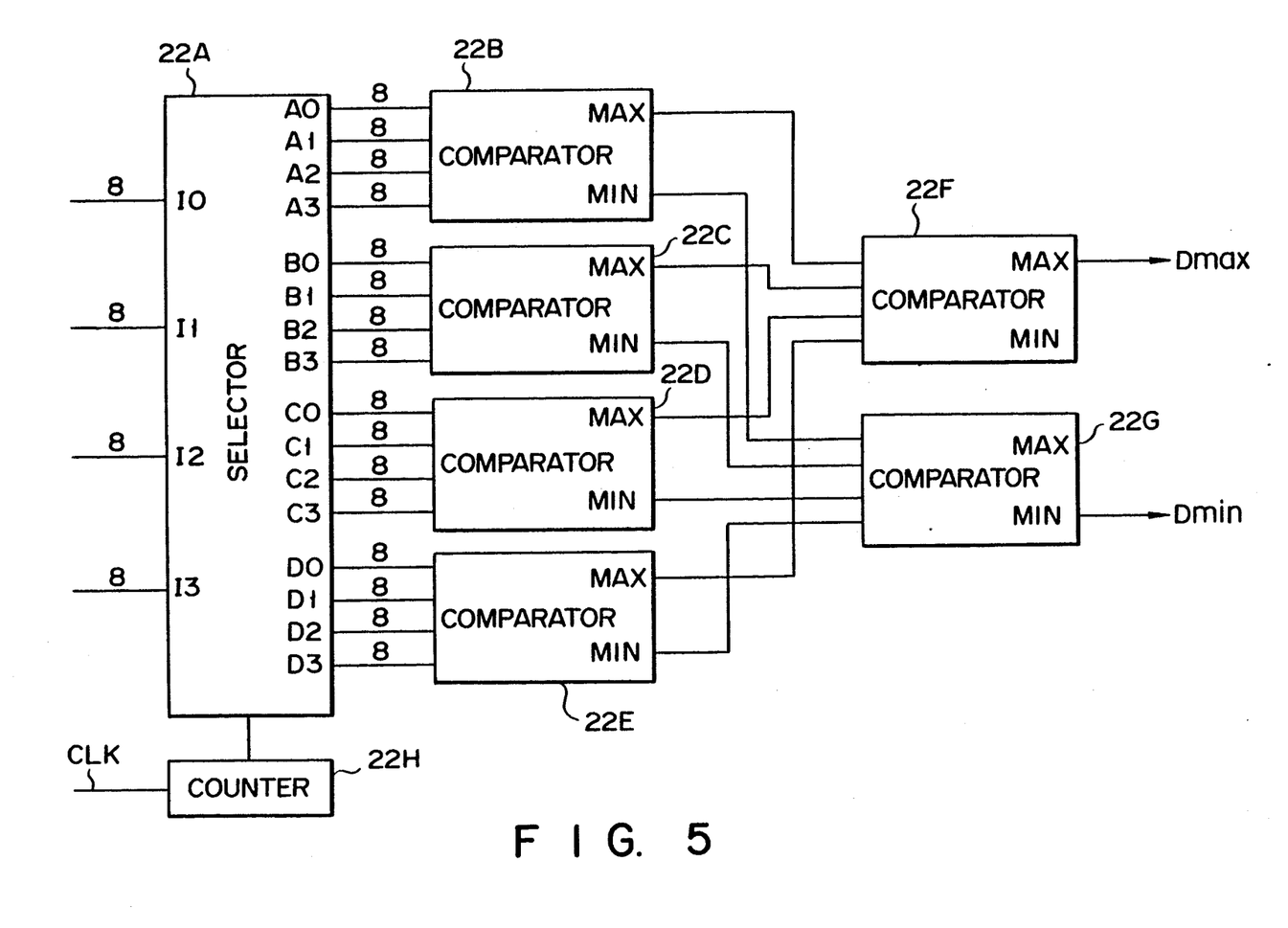
FIG. 5 is a block circuit diagram illustrating an example of a construction of the maximum/minimum calculation circuit shown in FIG. 1.

FIG. 5 shows the construction of maximum/minimum calculation circuit 22. As is shown in FIG. 5, maximum/minimum calculation circuit 22 is made up of the following elements: selector 22A having ports I0-I3, A0-A3, B0-B3, C0-C3 and D0-D3; comparators 22B, 22C, 22D and 22E connected to ports A0-A3, B0-B3, C0-C3 and D0-D3, respectively; comparators 22F and 22G connected to the output terminals of each of comparators 22B, 22C, 22D and 22E; and counter 22H connected to selector 22A.

From line buffer 1, the image information is supplied to ports I0-I3 of selector 22A in synchronism with a clock pulse such that four picture elements aligned in the row direction are supplied at one time. On the basis of a selection signal supplied from counter 22H, selector 22A supplies the image information, which selector 22A receives at ports I0-I3, to one of ports A0-A3, B0-B3, C0-C3 and D0-D3. In other words, selector 22A supplies the image information to one of comparators 22B, 22C, 22D and 22E on the basis of the selection signal supplied from counter 22H.

Each of comparators 22B, 22C, 22D and 22E compares the four picture elements aligned in the row direction with each other, thereby detecting the maximum image density and the minimum image density of the row. The maximum image densities detected by comparators 22B, 22C, 22D and 22E are supplied to comparator 22F, while the minimum image densities detected by them are supplied to comparator 22G. Comparator 22F compares the maximum image densities with each other in the line direction, thereby detecting the maximum image density of the local region. Likewise, comparator 22G compares the minimum image densities with each other in the line direction, thereby detecting the minimum image density of the local region.

Figure 6:
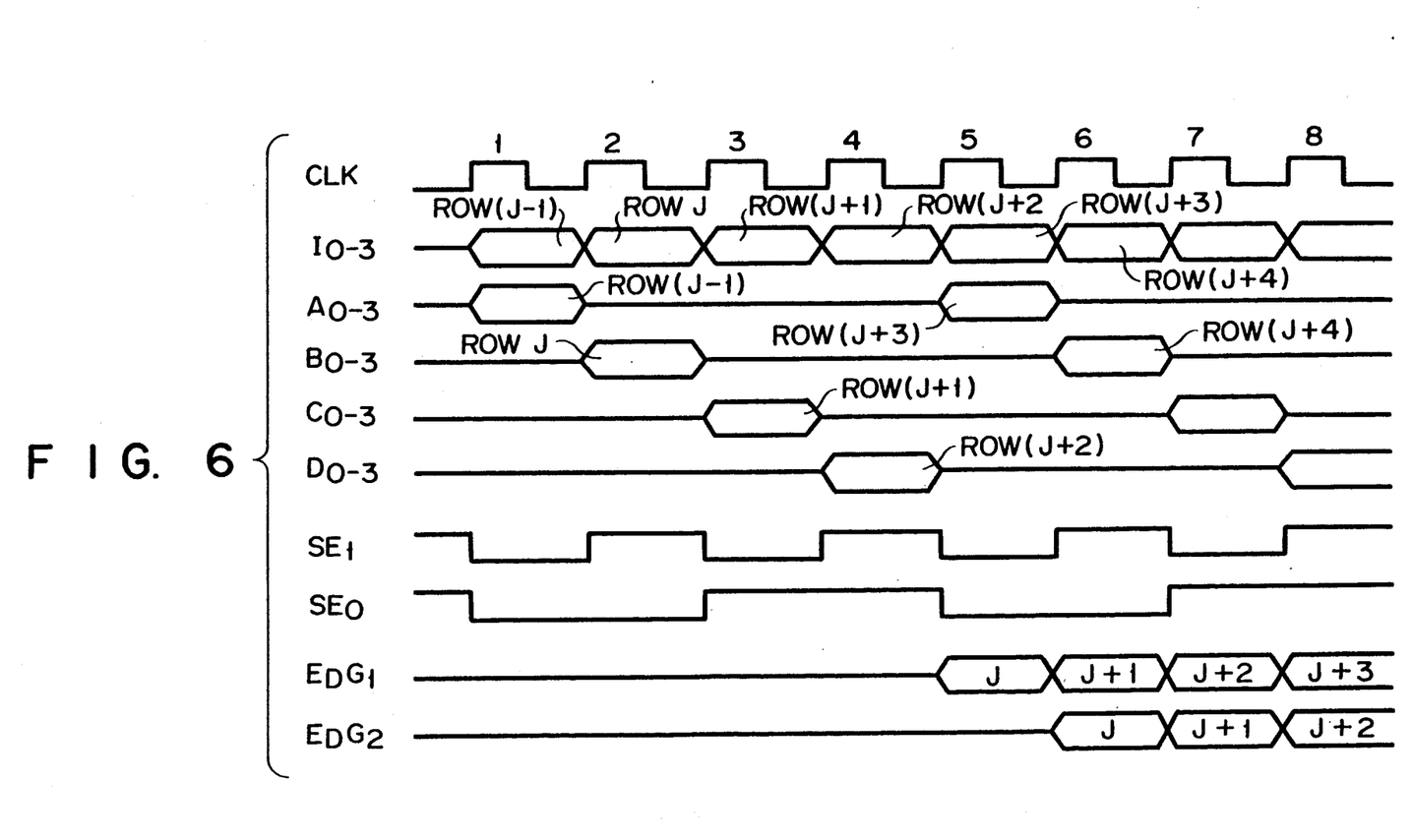
FIG. 6 is a timing chart illustrating how the maximum/minimum calculation circuit shown in FIG. 5 operates.

FIG. 6 is a timing chart for illustrating the operation of maximum/minimum calculation circuit 22. In FIG. 6, item (1) shows a clock pulse signal supplied to counter 22H, item (2) shows image information supplied to selector 22A, item (3) shows image information supplied to port A of selector 22A, item (4) shows image information supplied to port B of selector 22A, item (5) shows image information supplied to port C of selector 22A, item (6) shows image information supplied to port D of selector 22A, items (7) and (8) show selection signals which are generated by counter 22H and are supplied to selector 22A for the purpose of port selection, item (9) shows output information regarding comparators 22B, 22C, 22D and 22E, and item (10) shows output information regarding comparators 22F and 22G.

A description will be given of the operation of maximum/minimum calculation circuit 22, with reference to FIGS. 5 and 6.

When the first pulse is produced in signal CLK, selector 22A supplies the four picture elements aligned in the $(J-1)$ row from port I to port A. When the second pulse is produced in signal CLK, selector 22A supplies the four picture elements aligned in the J row from port I to port B. When the third pulse is produced in signal CLK, selector 22A supplies the four picture elements aligned in the $(J+1)$ row from port I to port C. When the third pulse is produced in signal CLK, selector 22A supplies the four picture elements aligned in the $(J+2)$ row from port I to port D. When the fifth pulse is produced in signal CLK, the maximum and minimum image densities of the rows are output from comparators 22B, 22C, 22D and 22E. When the sixth pulse is produced in signal CLK, the maximum and minimum image densities Dmax and Dmin are output from comparators 22F and 22G.

On the basis of the maximum and minimum values output from maximum/minimum calculation circuit 22, subtraction circuit 23 calculates the maximum image density difference ΔDmax as follows:

$$\Delta Dmax = Dmax - Dmin \ldots \quad (3)$$

This maximum image density difference ΔDmax is supplied to dividing circuit 24. In dividing circuit 24, the maximum image density difference is divided by the value of the average image density obtained by average calculation circuit 21, whereby the maximum image density difference is normalized. This normalized value is used as feature information representing the feature of the image formed in the local region. The normalized value, i.e., the feature information, is supplied to comparator circuit 25. The feature information is compared with the threshold value "Th1", thereby determining whether the image information of the local region represents a character or a photograph. On the basis of this determination, threshold value selection signal TS is generated, and this threshold value is supplied to both determination section 4 and threshold value selection section 5.

In the meantime, first threshold value calculation section 6 calculates threshold value BH, used for binary-encoding the image information, on the basis of the maximum and minimum image densities Dmax and Dmin obtained by maximum/minimum calculation circuit 22. The threshold value is calculated as follows:

$$BH = (Dmax + Dmin)/2 \ldots \quad (4)$$

On the basis of threshold value selection signal TS output from comparator circuit 25, threshold value selection section 5 selects either threshold value BH calculated by first threshold value calculation section 6 or the threshold value stored in second threshold value calculation section 7 as a dithering pattern. The selected threshold value is supplied to binary-encoding section 8. Therefore, this binary-encoding section binary-encodes the image information supplied from delay circuit 3 by use of the threshold value output from first threshold value calculation section 6 if the image information represents a character, and binary-encodes the image information by use of the threshold value output from second threshold value calculation section if the image information represents a photograph.

The determination results output from feature-analyzing section 2, the maximum image density difference output from subtraction circuit 23, and the average image density output from average calculation circuit 21 are supplied to determination section 4.

Figure 7:
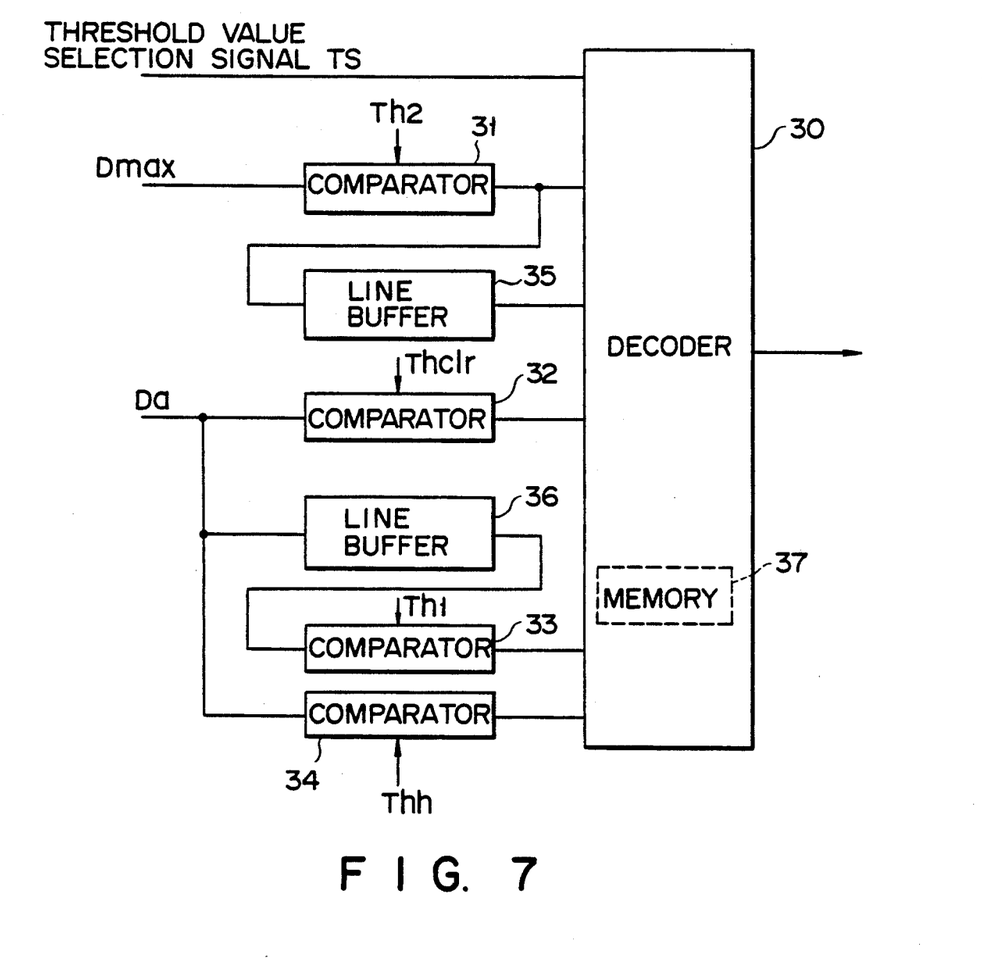
FIG. 7 is a block circuit diagram illustrating an example of a construction of the determination section shown in FIG. 1.

FIG. 7 shows the construction of determination section 4. This determination section is made up of decoder 30; comparators 31, 32, 33 and 34 connected to decoder 30; line buffer 35 connected between the output terminal of comparator 31 and an input terminal of decoder 30; and line buffer 36 connected between the input terminal of comparator 32 and that of comparator 33. Decoder 30 includes memory 37 made of a ROM or the like, the signals output from comparators 31, 32, 33 and 34 and the signal output from line buffer 35 are used as reading addresses of memory 37. Memory 37 stores either data "1" or data "0" on the basis of a predetermined address.

Decoder 30 receives threshold value selection signal TS output from comparator circuit 25. The operation of decoder 30 is stopped in the case where threshold value selection section 5 selects the output of first threshold value calculation section 6. In other words, in the case where comparator circuit 25 determines that the picture elements of a local region represent a character, determination section 4 does not determine whether or not the character is a bold character but simply outputs data "0". Therefore, selector section 9 selects the output of binary-encoding section 8 on the basis of the determination made by determination section 4, and produces the selected output.

Comparator 31 compares the maximum image density difference ΔDmax supplied from subtraction circuit 23 with threshold value Th2. If the maximum image density difference ΔDmax is large than threshold value Th2, comparator 31 outputs data "1". If not, comparator 31 outputs data "0". The result of this comparison (i.e., either data "0" or data "1") is supplied directly to decoder 30. It is also supplied to decoder 30 through line buffer 35.

Comparator 32 compares average image density DA supplied from average calculation circuit 21 with threshold value Thclr. If average image density DA is larger than threshold value Thclr, comparator 32 outputs data "1". If not, it outputs data "0". The result of this comparison (i.e., either data "0" or data "1") is supplied to decoder 30.

Line buffer 36 temporarily stores average image density DA supplied from average calculation circuit 21, and comparator 33 compares average image density DA with threshold value Th1. If average image density DA is larger than threshold value Th1, comparator 33 outputs data "1". If not, it outputs data "0". The result of this comparison (i.e., either data "1" or data "0") is supplied to decoder 30.

Comparator 34 compares average image density DA supplied from average calculation circuit 21 with threshold value Thh. If average image density DA is larger than threshold value Thh, comparator 34 outputs data "1". If not, it outputs data "0". The result of this comparison (i.e., either data "1" or data "0") is supplied to decoder 30.

Figure 8:
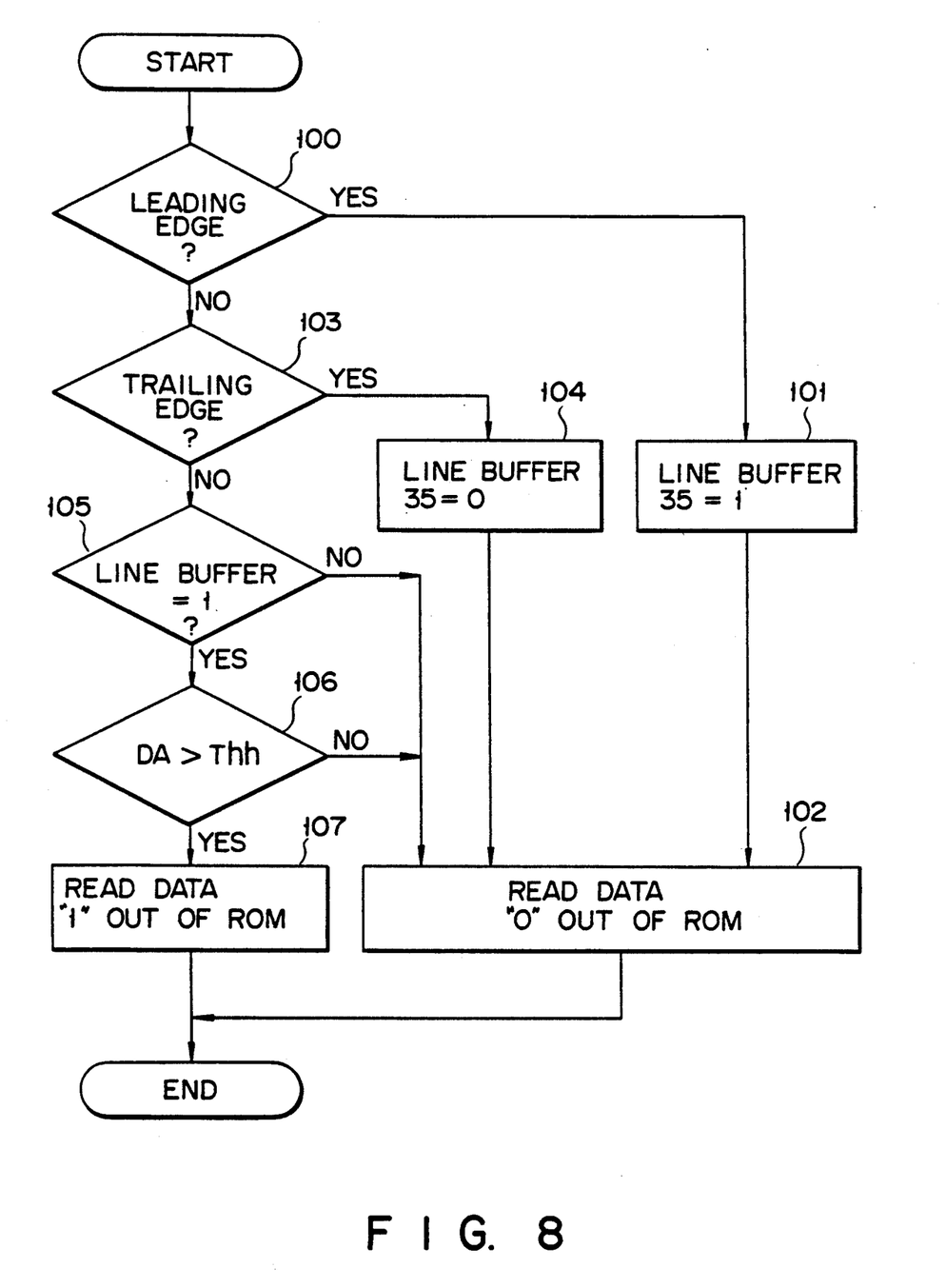
FIG. 8 a flow chart for explaining how the determination section shown in FIG. 7 operates.

A description may now be given as to how determination section 4 identifies a bold character, with reference to FIG. 8.

If determination section 4 receives threshold value selection signal TS from comparator circuit 25, then a check is made in Step 100 to see whether or not a picture element of interest included in a given local region represents a leading edge.

The picture element of interest is determined as representing a leading edge, if the following three conditions are satisfied at the same time: the condition wherein comparator 31 determines that the maximum image density difference ΔDmax of the picture element of interest is determined as being larger than threshold value Th2 (in this case, the image density difference of the picture element of interest is determined as being large); the condition wherein the maximum image density difference of the preceding picture element stored in line buffer 35 is determined as being smaller than threshold value Th2 (in this case, the image density difference of the preceding picture element is determined as being small); and the condition wherein the average image density of the preceding picture element stored in line buffer 36 is determined as being smaller than threshold value Th1.

If, in Step 100, the picture element of interest is determined as representing a leading edge, data "0" is read out of memory 37 of decoder 30 and is supplied to selector section 9 (Steps 101 and 102). In other words, the local region is determined as not being a bold character portion, and selector section 9 selects the image which has been binary-encoded by second threshold calculation section 7.

If, in Step 100, the picture element of interest is determined as not representing a leading edge, then a check is made in Step 103 to see whether or not the picture element represents a trailing edge. The picture element of interest is determined as representing a trailing edge, if the following three conditions are satisfied at the same time: the condition wherein comparator 31 determines that the maximum image density difference of the local region is determined as being smaller than threshold value Th2 (in this case, the image density difference is determined as being small); the condition wherein the maximum image density difference of the preceding picture element stored in line buffer 35 is determined as being larger than threshold value Th2; and the condition wherein the average image density of the local region is determined as being smaller than threshold value Thclr.

If, in Step 103, the picture element of interest is determined as representing a trailing edge, data "0" is read out of memory 37 of decoder 30 and is supplied to selector section 9 (Steps 104 and 102). In other words, the local region is determined as not being a bold character portion, and selector section 9 selects the image which has been binary-encoded by second threshold calculation section 7.

If, in Step 103, the picture element of interest is determined as not representing a trailing edge, a check is made in Step 105 to see whether or not line buffer 35 stores data "1". If line buffer 35 does not store data "1", data "0" is read out of memory 37 of decoder 30 and is supplied to selector section 9 (Step 102). In other words, the local region is determined as not being a bold character portion, and selector section 9 selects the image which has been binary-encoded by second threshold calculation section 7.

If line buffer 35 stores data "1", comparator 34 compares average image density DA of the local region with threshold value Thh (Step 106). If, in Step 106, average image density DA is determined as being smaller than threshold value Thh, data "0" is read out of memory 37 of decoder 30 and is supplied to selector section 9 (Step 102). In other words, the local region is determined as not being a bold character portion, and selector section 9 selects the image which has been binary-encoded by second threshold calculation section 7.

If, in Step 106, average image density DA is determined as being larger than threshold value Thh, data "1" is read out of memory 37 of decoder 30 and is supplied to selector section 9 (Step 107). In other words, the local region is determined as being a bold character portion, and selector section 9 selects data "1", in place of the output signal of binary-encoding section 8. Therefore, data "1" (i.e., data representing black color) is output in the case where image information is determined as representing a bold character portion. As a result, deterioration of the image quality of the bold character portion is prevented.

According to the above-mentioned embodiment, the average image density of image information is referred to in the case where the image density difference of that image information is so small that it is unknown whether the image information represents a low-contrast character portion or a photograph portion. The image information is determined as representing a low-contrast character portion if the average image density is small, and is determined as representing a photograph portion if the average image density is large. By utilizing this feature of the average image density of the image information, the present invention reliably detects the low-contrast character portion. Even if the image density difference is substantially zero, as in the case of the image density difference corresponding to a region on a bold character, determination section 4 checks whether the picture element related to the image density difference is located inside or outside of an edge, so that the range of the bold character is reliably detected and the image information can be processed in accordance with this range detection.

As may be understood from the above, the present invention binary-encodes image information in a reliable manner, without reference to the image density difference of a local region. If a picture element of interest is determined as representing a bold character portion, selector section 9 replaces the picture element with data "1". Therefore, the bold character is prevented from becoming blurred.

The present invention is not limited to the embodiment mentioned above; it may be modified in various manners, if necessary. For example, the local region need not be an area of 4×4 picture elements and may be increased or decreased in accordance with the need.

The above embodiment was described, referring to the case where image information is examined in units of one picture element. However, the image information may be examined in units of a block of N×N, so as to increase the processing speed.

The way in which first threshold calculation section 6 calculates threshold value BH is not limited to the above-mentioned formula (4). For example, threshold value BH may be defined as BH=DA, by using the average image density detected in a predetermined range. Additionally, threshold value BH may be defined as BH=DA+α (α: allowable range). If an allowable range is included in the definition of threshold value BH, reliable formation of an image is expected even if the condition under which the image binarization apparatus is used is altered and the image information input condition is thus altered.

Further, the threshold values in a dithering pattern need not be arranged in a dot dispersion fashion, as mentioned above. They may be arranged in a dot centralized fashion, or the like.

The threshold values in the dithering pattern may be also arranged in a nonlinear fashion in accordance with the types of output devices. If they are arranged in this fashion, optimal gradation expression is enabled in accordance with various types of printers, such as a laser printer, a thermal transfer printer, an ink jet printer, etc.

Finally, in the above embodiment, the values indicating the features of image information and threshold values used as criterion are calculated on the basis of the reflectance of the image information read by an image reader. However, they may be calculated in consideration of the visual abilities of the average human being.

What is claimed is:

1. An image binarization apparatus for converting image information into binary-encoded image information, said image binarization apparatus comprising:
    determination means for determining whether or not the image information has a bold character portion;
    means for binary-encoding the image information by use of a predetermined threshold value; and
    means for outputting a predetermined value in place of the binary-encoded image information outputted from the binary-encoding means, if the determination means determines that the image information has a bold character portion.

2. An apparatus according to claim 1, further comprising first determination means, for determining whether image information of a predetermined range including an image of interest is character information or photograph information.

3. An apparatus according to claim 2, wherein said first determination means includes:
    first calculation means, for calculating an average image density of the predetermined range by use of the image information of the predetermined range including the image of interest;
    second calculation means, for calculating a maximum image density difference of the image information of the predetermined range;
    means for dividing an output of the second calculation means with an output of the first calculation means; and
    means for comparing the result of the division performed by the dividing means with a predetermined value, to thereby determine whether the image information is character information or photograph information.

4. An apparatus according to claim 3, wherein said first calculation means includes:
    a plurality of first adder means, each for adding together a predetermined number of picture elements of the image information;
    means for supplying the picture elements to the plurality of first adder means;
    second adder means, for adding together sums obtained by the plurality of first adder means; and
    means for dividing a sum obtained by the second adder means with the total number of picture elements, to thereby calculate an average image density of the image information.

5. An apparatus according to claim 3, wherein said second calculation means includes:
    first comparator means, for calculating maximum and minimum image densities of the image information in units of a predetermined number of picture elements; and
    second comparator means, for calculating maximum and minimum densities of a local region on the basis of the maximum and minimum image densities produced by the first comparator means.

6. An apparatus according to claim 2, wherein said binary-encoding means includes:
    first threshold value calculation means, for calculating a threshold value used for binary-encoding the character information;
    second threshold value calculation means, for calculating a threshold value used for binary-encoding the photograph information; and
    threshold value selection means for selecting one of the threshold values calculated by the first and second threshold value calculation means, in accordance with the determination made by the first determination means.

7. An apparatus according to claim 6, wherein said second threshold value calculation means includes a memory for storing a threshold value corresponding to a dithering matrix.

8. An apparatus according to claim 2, wherein said determination means includes:
    means for storing a predetermined signal corresponding to the bold character portion; and
    means for setting a reading address of the storing means in accordance with the results of the determination made by the first determination means.

9. An image binarization apparatus for converting image information into binary-encoded image information, said image binarization apparatus comprising:
    first determination means for determining whether image information of a predetermined range has character information or photograph information;
    first threshold value calculation means for calculating a first threshold value used for binary-encoding the character information;
    second threshold value calculation means, for calculating a second threshold value used for binary-encoding the photograph information;
    first selection means for selecting one of the first and second threshold values calculated by the first and second threshold value calculation means in accordance with the determination made by the first determination means;
    means for binary-encoding the image information by use of the threshold value selected by the first selection means;

second determination means for determining whether or not the image information has a bold character portion on the basis of results of the determination made by the first determination means; and means for outputting a predetermined value in place of the binary-encoded image information outputted from the binary-encoding means, if the second determination means determines that the image information has a bold character portion.

10. An apparatus according to claim 9, wherein said first determination means includes:

first calculation means, for calculating an average image density of the predetermined range by use of the image information of the predetermined range including the image of interest;

second calculation means, for calculating a maximum image density difference of the image information of the predetermined range;

means for dividing an output of the second calculation means with an output of the first calculation means; and means for comparing the result of the division performed by the dividing means with a predetermined value, to thereby determine whether the image information is character information or photograph information.

11. An apparatus according to claim 10, wherein said first calculation means includes:

a plurality of first adder means, each for adding together a predetermined number of picture elements of the image information;

means for supplying the picture elements to the plurality of first adder means;

second adder means, for adding together sums obtained by the plurality of first adder means; and means for dividing a sum obtained by the second adder means with the total number of picture elements, to thereby calculate an average image density of the image information.

12. An apparatus according to claim 10, wherein said second calculation means includes:

first comparator means, for calculating maximum and minimum image densities of the image information in units of a predetermined number of picture elements; and subtraction means for subtracting the minimum image density from the maximum image density, to thereby calculate a maximum image density difference.

13. An apparatus according to claim 9, wherein said second threshold value calculation means includes a memory for storing a threshold value corresponding to a dithering matrix.

14. An apparatus according to claim 9, wherein said second determination means includes:

means for storing a predetermined signal corresponding to the bold character portion; and means for setting a reading address of the storing means in accordance with the results of the determination made by the first determination means.

15. An apparatus for determining whether or not image information represents a bold character, comprising:

first determination means for determining whether or not a given picture element included in a local region represents a leading edge;

second determination means for determining whether or not the given picture element represents a trailing edge, if the given picture element is determined by the first determination means as not representing a leading edge;

third determination means for determining whether or not a picture element preceding the given picture element represents a leading edge, if the given picture element is determined by the second determination means as not representing a trailing edge; and fourth determination means for determining whether an average image density of the local region is greater than a predetermined value if the picture element preceding the given picture element is determined by the third determination means as representing a leading edge, and of determining that the given picture element represents a bold character portion if the average image density of the local region is determined as being greater than the predetermined value.

* * * * *